United States Patent
Deutschmann et al.

(10) Patent No.: US 10,650,163 B2
(45) Date of Patent: May 12, 2020

(54) BOT DETECTION AND ACCESS GRANT OR DENIAL BASED ON BOT IDENTIFIED

(71) Applicant: BehavioSec Inc, San Francisco, CA (US)

(72) Inventors: Ingo Deutschmann, Merseburg (DE); Per Burstrom, Lulea (SE); Neil Costigan, Lulea (SE)

(73) Assignee: BEHAVIOSEC INC, San Francisco, CA (US)

( * ) Notice: Subject to any disclaimer, the term of this patent is extended or adjusted under 35 U.S.C. 154(b) by 0 days.

(21) Appl. No.: 16/540,128

(22) Filed: Aug. 14, 2019

(65) Prior Publication Data

US 2019/0370493 A1     Dec. 5, 2019

(51) Int. Cl.
*G06F 21/62* (2013.01)
*G06F 21/31* (2013.01)
*H04L 29/06* (2006.01)

(52) U.S. Cl.
CPC ........ *G06F 21/6245* (2013.01); *G06F 21/316* (2013.01); *H04L 63/083* (2013.01)

(58) Field of Classification Search
CPC . G06F 21/6245; G06F 21/316; H04L 63/083; H04L 63/0861; H04L 63/145
USPC .......................................................... 726/4
See application file for complete search history.

(56) References Cited

U.S. PATENT DOCUMENTS

| | | | | |
|---|---|---|---|---|
| 9,075,990 B1 * | 7/2015 | Yang | .................... | H04L 63/105 |
| 9,298,901 B1 * | 3/2016 | Boss | ...................... | G06F 21/31 |
| 9,767,263 B1 * | 9/2017 | McInerny | ............... | G06F 21/31 |
| 10,225,255 B1 * | 3/2019 | Jampani | .................. | H04L 63/10 |
| 10,270,792 B1 * | 4/2019 | Shemesh | ............. | H04L 63/1441 |
| 10,298,599 B1 * | 5/2019 | Zhang | ..................... | H04L 67/42 |
| 10,375,046 B1 * | 8/2019 | Samvelian | ............. | H04L 63/08 |
| 2007/0198319 A1 * | 8/2007 | Sciuk | ............... | G06Q 10/06316 |
| | | | | 705/7.26 |
| 2008/0021903 A1 * | 1/2008 | Singhal | ............... | G06F 16/9535 |
| 2008/0086522 A1 * | 4/2008 | Biggs | ................. | H04L 63/0245 |
| | | | | 709/202 |
| 2009/0044264 A1 * | 2/2009 | Ramanathan | ......... | G06F 21/552 |
| | | | | 726/14 |
| 2009/0204820 A1 * | 8/2009 | Brandenburg | ......... | G06Q 10/06 |
| | | | | 713/182 |
| 2010/0037147 A1 * | 2/2010 | Champion | ............ | G06F 21/316 |
| | | | | 715/751 |
| 2011/0029902 A1 * | 2/2011 | Bailey | ..................... | G06F 21/36 |
| | | | | 715/764 |
| 2012/0117239 A1 * | 5/2012 | Holloway | ........... | H04L 63/0884 |
| | | | | 709/226 |
| 2012/0144455 A1 * | 6/2012 | Lazar | ..................... | G06F 21/31 |
| | | | | 726/4 |

(Continued)

*Primary Examiner* — Aravind K Moorthy
(74) *Attorney, Agent, or Firm* — Michael J. Feigin, Esq.; Feigin and Fridman LLC

(57) ABSTRACT

A user accessing data from a server in an authenticated session is determined to be human, an authorized bot, or a non-authorized bot based on receipt of behaviometric information from the user's interactions and responses to and with the server. The user is then denied or granted continued access to receive data, such as financial data, after it is determined if the user is authorized to do so by way of comparing the behaviometric data to known prior behaviometric data for particular humans and bots in embodiments of the disclosed technology.

20 Claims, 3 Drawing Sheets

(56) References Cited

U.S. PATENT DOCUMENTS

| | | | |
|---|---|---|---|
| 2012/0210420 A1* | 8/2012 | Rybalko | H04L 51/12 726/22 |
| 2013/0226952 A1* | 8/2013 | Lal | H04L 67/02 707/767 |
| 2013/0276125 A1* | 10/2013 | Bailey | H04L 63/1433 726/25 |
| 2014/0019488 A1* | 1/2014 | Wo | G06F 21/6218 707/784 |
| 2014/0195428 A1* | 7/2014 | Ghetler | G06Q 20/3272 705/44 |
| 2014/0320396 A1* | 10/2014 | Modarres | G06F 1/1643 345/156 |
| 2015/0281263 A1* | 10/2015 | McLaughlin | G06Q 30/0201 726/22 |
| 2016/0112538 A1* | 4/2016 | Wo | H04L 67/32 709/225 |
| 2016/0344765 A1* | 11/2016 | Shiell | H04L 63/1458 |
| 2017/0289070 A1* | 10/2017 | Plumb | H04L 51/02 |
| 2017/0345003 A1* | 11/2017 | Spears | G06Q 20/4016 |
| 2017/0357638 A1* | 12/2017 | Schlesinger | G06F 17/28 |
| 2017/0358296 A1* | 12/2017 | Segalis | G10L 15/222 |
| 2017/0366478 A1* | 12/2017 | Mohammed | H04L 51/04 |
| 2017/0366621 A1* | 12/2017 | Sagar | H04L 51/02 |
| 2018/0150524 A1* | 5/2018 | Anger | H04L 51/02 |
| 2018/0152465 A1* | 5/2018 | Levin | H04L 63/1425 |
| 2018/0152571 A1* | 5/2018 | Iwata | G06F 9/452 |
| 2018/0191907 A1* | 7/2018 | Herrin | G10L 15/26 |
| 2018/0332042 A1* | 11/2018 | Yu | H04L 63/0884 |
| 2018/0332167 A1* | 11/2018 | Lu | G06F 16/3322 |
| 2019/0049931 A1* | 2/2019 | Tschirschnitz | G05B 19/41865 |
| 2019/0050269 A1* | 2/2019 | Anderson | G06F 9/5077 |
| 2019/0089697 A1* | 3/2019 | Delaney | H04L 63/0838 |
| 2019/0089798 A1* | 3/2019 | Driscoll | H04L 51/02 |
| 2019/0114314 A1* | 4/2019 | Billman | G06F 17/243 |
| 2019/0116103 A1* | 4/2019 | Ravid | H04L 67/18 |
| 2019/0124160 A1* | 4/2019 | Dhamnani | H04L 63/1441 |
| 2019/0129827 A1* | 5/2019 | Ramasamy | G06F 11/3624 |
| 2019/0138914 A1* | 5/2019 | Meadows | G06N 5/02 |
| 2019/0147451 A1* | 5/2019 | Deutschmann | G06Q 20/02 705/42 |
| 2019/0158535 A1* | 5/2019 | Kedem | H04L 63/1483 |
| 2019/0171513 A1* | 6/2019 | Purushothaman | G06F 11/0793 |
| 2019/0171845 A1* | 6/2019 | Dotan-Cohen | H04L 63/105 |
| 2019/0179469 A1* | 6/2019 | Quinn | G06F 3/0414 |
| 2019/0187265 A1 | 6/2019 | Barbello et al. | |
| 2019/0272540 A1* | 9/2019 | Wells | G06Q 20/042 |
| 2019/0303232 A1* | 10/2019 | Antonio | G06F 11/3495 |
| 2020/0028874 A1* | 1/2020 | Lam | H04L 63/1416 |

* cited by examiner

BOT DETECTION AND ACCESS GRANT OR DENIAL BASED ON BOT IDENTIFIED

FIELD OF THE DISCLOSED TECHNOLOGY

The disclosed technology relates to behaviometric user authentication and, more specifically to determining if a user is, or is controlled in part by a bot and granting or denying access based on which bot is identified.

BACKGROUND OF THE DISCLOSED TECHNOLOGY

Modern computerized systems are increasingly reliant on automatic programs labeled as "bots" to access systems remotely. These programs are quickly becoming more capable, complex, and useful, and as such get to handle more important tasks and with higher value. In the consumer banking sector, the Payment Services Directive (PSD1) effective from 2009 in the European Union required banks (in this context named ASPSPs, Account Servicing Payment Service Providers) to share user transaction and account information with Third Party Providers (TPPs) that were registered as Payment Service Providers if the end costumer approved the TPP to do so. The regulation gave rise to the so called "FinTech" (financial technology) companies which provided new services and innovative thinking to the financial sector. A shortcoming of PSD1 was that there was no specification on which way the ASPSPs were supposed to provide the information, so the method the FinTech companies typically chose to access the account information was by bots that collect the information from the banks web site via so called screen-scraping (also termed web scraping, data scraping etc.) Screen-scraping means that the TPP uses a bot to browse the web site, enter the customers login credentials to access the account, and view/download the information, not unlike the way a human acquires the information. However, the specific way the bot works needs to be programmed by the TPP for each individual service requested and for different ASPSPs, since their web sites differ.

In the PSD2, effective from 2018, further TPP agents were introduced (Account Information Service Providers and Payment Initiation Service Provider). This enabled FinTech companies to access even more banking data and develop applications that mediate payment services, visualize account information across all the customer's banks, track and analyze household spending habits and so on. The PSD2 proposed a formulation that forbids the use of screen-scraping for payment accounts (not the other types) without the TPPs identifying themselves first. The use of this technique has been wildly debated for several years, where ASPSPs want to force all TPPs to access the banks via Application Programming Interfaces (API) instead, which would increase security but also put the ASPSPs in full control of the data shared. Critics proclaim this will stifle innovation and hamper the FinTech industry. The open banking concept, and indeed the UK namesake, Open Banking Limited, are alternatives developed for open source code-based API access to mitigate the problems of screen scraping. In the UK, this will come into effect in September 2019, but the rest of the EU have not agreed on such a date. With this, new possibilities for strong customer authentication (SCA) have been proposed by the European Banking Association (EBA).

However, the TPPs stand by and defend screen-scraping despite the obvious drawbacks and prefer to use it for several reasons. It relies on the well-established and quite legal activity of machine-reading web sites, which is omni-present in many areas of the Internet. The FinTech industry has used this technology for over 15 years without a single reported data leakage where credentials were compromised. The industry further "argues" that closed source code operating systems (such as Windows and Mac OS) and browsers (Firefox, Chrome, IE, Safari) must anyway be used for accessing the ASPSPs services, which is potentially less secure and transparent than the open standards used by the TPPs. Regardless of the future developments in the legal framework, screen-scraping will continue to be prevalent for many ASPSPs for years to come.

Another area where bots are frequently used for high-value tasks are the complex industrial and other networks that constitute command and control, process regulation, grid steering and other large-scale systems critical to infrastructure, public well-being, and the connected and intelligent factory technologies going under the umbrella name of "Industry 4.0." Typical applications where bots are used are to perform maintenance, surveillance, and measurements, since the use of them is often much more cost-effective than trying to implement such as with an API in legacy systems.

With the widespread practice of screen-scraping, the ASPSPs lose all control of who is connecting to the account. The customer credentials must be stored at the TPP, and the process results in human customers becoming familiar with and accepted passing their authentication credentials to other entities which is a weak security practice. In addition, the human customer often grants access to their information indefinitely and may even forget which TPPs they have shared the information with, meaning credentials that were originally intended to be only known by a single person risk being stored in several different locations, at companies that can be bought and sold in several iterations.

It is easy to see that a data leak from a TPP could have disastrous consequences. Should login credentials leak from a TPP, customers' accounts could be accessed and used fraudulently in large numbers. One major problem when it comes to protect against stolen credentials is that the fraudulent use stemming from a leak will be hard to discern from the legitimate use of the screen-scraping bots used by the TPPs, and even under the new PSD2 legislature, a fraudulent actor would only need to provide the ASPSP with the identifier of the TPP. The ASPSP must then grant the access, as required by the regulations.

Also, in the case where the TPP communicates with APIs to the ASPSP there still exists a possibility that a fraudulent actor can misuse such data. An application that mediates API calls, i.e. by automatic scripting or manual access, could be used with stolen credentials to gain unauthorized access.

In a utility network, the bot login credentials might not even be kept under encryption or obfuscation, as the humans supervising the bot operations are typically considered benign and authorized users by themselves. However, an unauthorized access by a human using the bot credentials could still have severe consequences, by mistake or intent, and therefore the system operators in many cases want to be certain these credentials are not used by human operators.

In all cases above, there is no reasonably known way to a skilled person of making sure, in the prior art, that the entity seeking access is either the bot doing the TPP's work, or the bot performing the wanted utility tasks. No known mechanism exists at the accessed ASPSP's network to ensure the bot is the one used by the TPP granted authentication, or at the utility network's accessed device, machine, or plant, to safeguard against human missteps caused by access given to humans through faulty credentials. Bots are not, typically, equipped with mechanisms to handle two factor or hardened cryptographic tokens and obviously they are not suitable for biometric authentication, such as fingerprints, facial recognition or iris scanning. These limitations force a system designed to provide access with credentials that are easy to clone or copy.

Thus, what is needed is a way of ensuring that access is being granted only to a bot which should have access to a user account or financial information, even if the bot has the proper user authentication credentials.

SUMMARY OF THE DISCLOSED TECHNOLOGY

Authentication is achieved by way of behaviometric, biometric, password input, or other authentication mechanisms. Collection of behaviometric data originating from a user of a device is further processed. For purposes of this disclosure, the following definitions are used. "User" refers to either a human user or a bot operating an end user device. "Authentication" is the verification of that a user is allowed to access certain data based on receiving an input from or related to the user including any of biometric, behaviometric, and/or inputs to sensors including key presses, passwords, code numbers, and patterns. "Biometric" is data which relates to the biology or physiology of a user including a retinal pattern, fingerprint, or face configuration. "Behaviometric", used interchangeably as an adjective with "behavioral", is data pertaining to a manner of operation of a device as recorded by one or a plurality of sensors in the device or by way of external sensors in other devices. This includes accelerometers, gyroscopes, touch sensors (including touch screens), and processors which measure any or a combination of device angle, key press, position on a screen pressed, swipe speed, swipe intensity (pressure), temperature, and so forth. Behaviometric data changes over time in some instances whereas biometric data is more likely to remain constant or substantially constant. "Data" is any tangible information which can be or is stored on a physical disk, volatile memory, and/or transferred via a network connection.

Bots are used to access financial or other data associated with a particular person or legal entity. In some cases, these bots are granted access to the data, when such a bot is authorized to access the data. In other cases, the bot is denied access to the data. A "bot" for purposes of this disclosure is a "series of scripts designed to send/receive data via a packet switched network to/from a physical hardware server and a plurality of network nodes" such as via a browser which renders content received via the http protocol. More specifically, in some embodiments a "bot" is further defined as, "a script designed to retrieve and/or receive input fields (designed for display or sent via code which are interpreted to be a query to respond to) and provide responses thereto based on a prior set of instructions received."

Embodiments of the disclosed technology are thus carried out by sending data via a first network node sufficient to generate input requests on an end user computer device residing at a second network node, such input requests which can be in the form of a field to enter data, a button to click, or an API request for particular data. Responses to the input requests are received from the end user computer device, which at the time of receipt or first receipt, can be unknown if being received from an authorized bot, non-authorized bot, or human operating the end use computer device. A combination of operators may be causing the responses to be generated as well.

The responses received via one or a plurality of network nodes over the packet switched network are then compared to each other and/or responses received from known authorized and/or non-authorized bots and/or humans to determine which operator is controlling the end user computer device and sending the responses. These responses received and timings thereof can be timings of particular responses to particular queries, such as how long was taken between sending a query/finishing sending a query and receiving a response and comparing these in series over multiple responses as well as the order of responses receiving, data therein, where buttons were clicked, how hard buttons were clicked or touched, and so forth as described in further detail in the detailed description. Once a particular bot is identified, additional data is sent, with or without the knowledge of the bot, which is based on whether the operator of the end user computer device has been determined to be an authorized bot, non-authorized bot, or human. The additional data can be selected from sending or denying access to personal information, financial information, or data associated with a particular individual or legal entity for whom the end user computer device is sending data to gain access thereto.

The timings of responses received can include time between sending of a first and second response as well as subsequent responses. Different bots respond, in some embodiments, each with distinct and different timings compared to other bots.

The end user computer device, in some embodiments of the disclosed technology, is sent personal financial data while the identity/type of actor at the end user computer device is unknown. Once a determination that the actor controlling the end user computer device (including a bot which sends data which appears to be from a particular end user computer device) is identified as a non-authorized bot, a request for the personal financial data from the end user computer device is denied.

The comparing step can be the comparing of a position where data was entered, such as a position where a button or display was depressed on a screen with a mouse click or (simulated) touch, e.g. the X and Y coordinates. The comparing might be comparing responses of various input fields received at different times and finding patterns which match that of a particular bot even if a particular received response is different than another received response for a same input field. The input position and timing can be averaged over two or more inputs to determine that a bot is a particular prior known unauthorized or authorized bot.

Described another way, data from a first network node at a first location on a packet switched network is sent to a second network node at a second location on the packet switched network requiring a user to provide authentication credentials to access secure data. These authentication credentials are received and at least some additional data is sent from the first network node to the second network node. The received data (for authentication or thereafter) is compared to prior received data from a plurality of bots and it is determined which bot is sending the data from the second network node. Access to data, and sending of such data there-accessible, including at least some personal data, is sent to the second network node until a determination is made that the second network node is sending data from a non-authorized bot. At such time, the sending of at least some further data is denied to the second network node, such as data with personal information related to the person or entity associated with the authentication credentials.

The comparing is comparing of key press timings, mouse movements, where on and how a screen or interface an input was received (including where it was reported to have been received), and/or comparing which order data is received from the second network node, the data corresponding to particular requests for certain data in some embodiments.

The order of particular requests is directed to a type of financial transaction to be carried out in some embodiments. That is, a certain bot may, for example, always first request information including an account balance before transferring funds in the amount of the account balance in this order. This can help identify a particular bot as can the timings between such requests for data and responses received to queries send there-to. When the timing of a response, matched with, in some embodiments, a timing of a request and/or action to be carried out, matches a particular bot, the bot is thus identified.

Any device or step to a method described in this disclosure can comprise or consist of that which it is a part of, or the parts which make up the device or step. The term "and/or" is inclusive of the items which it joins linguistically and each item by itself. "Substantially" is defined as "at least 95% of the term being described" and any device or aspect of a device or method described herein can be read as "comprising" or "consisting" thereof.

DETAILED DESCRIPTION OF EMBODIMENTS OF THE DISCLOSED TECHNOLOGY

Figure 1:
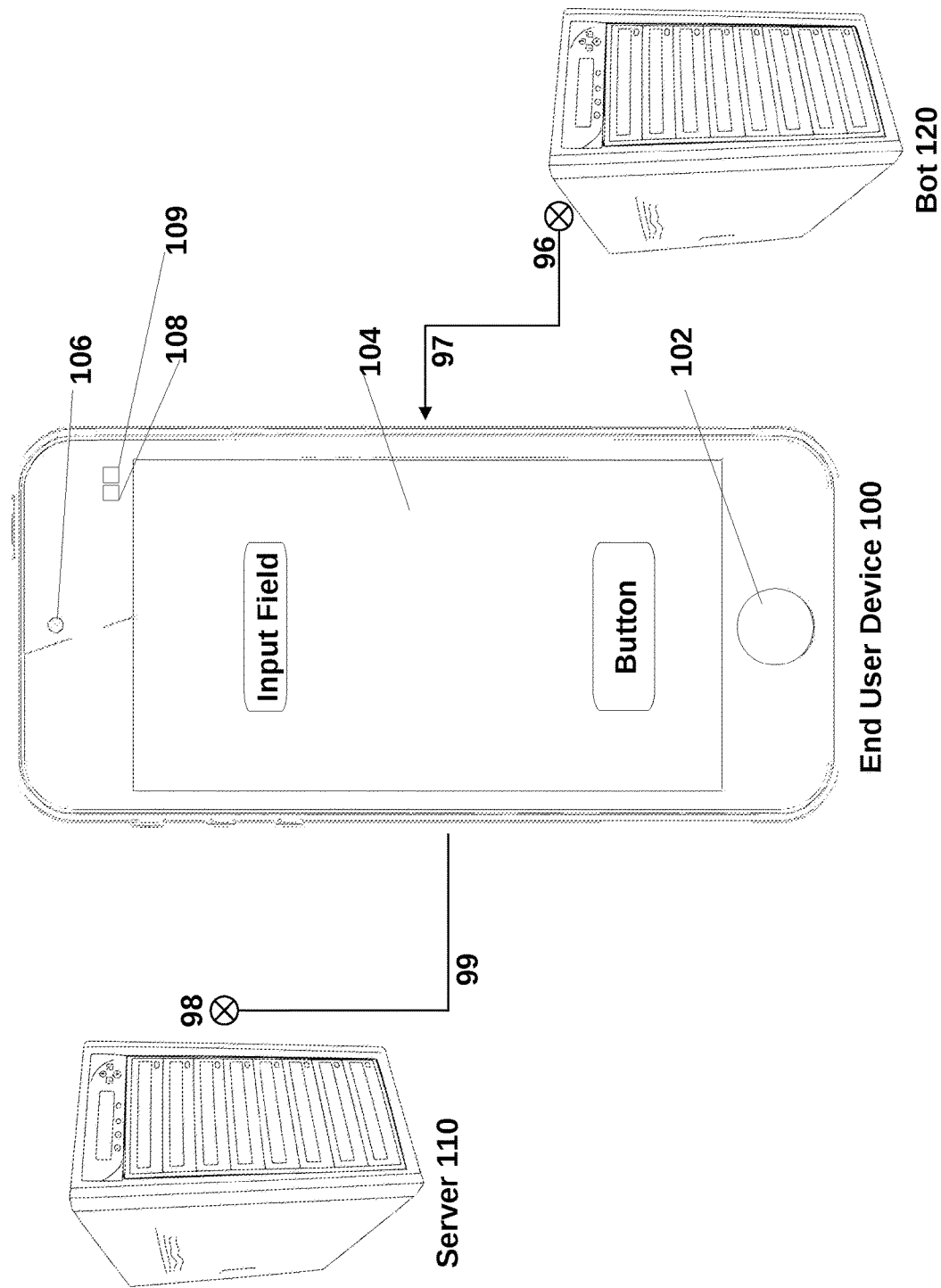
FIG. 1 shows a high level diagram of devices used to carry out embodiments of the disclosed technology.

A financial institution web page typically has an initial login page where authentication information is entered. After providing authentication credentials, a server sends to an end user computing device, in embodiments of the disclosed technology, options such as account information, financial transfers, viewing bills, loans, and other financial data pertaining to a person associated with the authentication credentials. One uses an API, a hardware display, and/or an input device to interact therewith and provide responses, including inputs of data, to obtain data from the server pertaining to the person.

A bot using a (banking) web page or server designed for human viewing is typically detectable by methods from behavioral actions, such as key press timings, where on a page a user has clicked, speed of data entry, pressure applied on a screen, how one swipes the screen, order of data entry, angle in which a device is held, and other behavioral characteristics (defined as "a manner in which a user interacts with an end user computer device which are often distinctive and allow identification of a particular person"). This can further be determined based on keystroke dynamics (dwell and flight times), mouse or swipe movements (features calculated from time series of the sampled coordinate triplets x, y, time), timing and location of clicks, device sensors, or method and speed of navigation between fields. While the most advanced bots can mimic some aspects of human behavior if they are deliberately constructed to do so, methods exist to detect such attempts which are used in embodiments of the disclosed technology as part of determining which bot is operating or sending data on behalf of an end user computer device. Further data which can be used to differentiate a bot from another and determine if it is a bot which is authorized or non-authorized is total time to carry out an action (send a response), total latency between responses sent and new requests received, and efficiency of mouse movement travel between fields.

In the case of calls to an API, such as a proprietary API or open banking APIs, the method monitors the calls to the API from the remote party. Such calls may be authorization requests as required by Strong Customer Authentication (SCA), such as using OAuth 2.0, redirects, or other types, as well as ordinary weak credential accesses such as account information requests, contactless payments, recurring transactions etc. Here, the sequential order, what calls are used, and what time delays (apart from network lag etc.) for each kind of action the TPP performs are used as features. Different API call sequences such that each request by the remote party is classified by bot and any new sequence of API calls is identified. A human tampering with manually injecting calls would differ significantly from the learned pattern of a particular bot or type of bot such that the method would flag and alert of same so that access can be denied or granted as the "bot" is classified as authorized or non-authorized.

In an active mode, the method creates bot signatures and exchanges this with specific TPPs or remote devices, such that they receive a unique signature that is identifiable by behavior. Such a signature only has to comprise a small, very specific part of how the bot performs its operations, for example a single erratic cursor movement or placement in a field, a key press or flight time, or specific delay between actions. Any of these may constitute a unique bot signature behavior that makes it possible to distinguish the bot seeking access from all others, thereby allowing only the correct bot to obtain data or continue to obtain data associated with a specific user. The signature behavior is parametrized and shared with the specific TPP or remote device using a secret public private key pair.

In some embodiments, behavioral analyzing is used to grant one or more bot signatures access via use of the credentials, thereby "whitelisting" the bots and designating the bot as authorized while continuing to send data to the bot via an end user device the bot is operating.

In some embodiments, access to one or more specific bot signatures out of several such detected signatures is granted to send data via the end user device the bot is operating.

In some embodiments, meta/context data such as IP (Internet Protocol address), location, time of day, and other factors are used to decide whether a bot is authorized.

Embodiments of the disclosed technology will become more clear in view of the following description of the figures.

FIG. 1 shows a high-level diagram of devices used to carry out embodiments of the disclosed technology. Here, the server 110 sends content over a packet-switched network 99 by way of a network node 98. The end user device 100 receives this content/data and stores content or retrieves previously stored content using a storage device 108. When the server 110 delivers content to the end user device 100, this is, in embodiments, secure content intended only for an authenticated user of the end user device 100 requiring a basic and/or stepped up authentication. Such data is, in embodiments of the disclosed technology, also be stored on the storage device 108 and retrieved only after authentication.

The end user device 100 has data stored thereon, as described above, or is retrieved from a network, only after a user's identification or a security code is received to confirm the user can access such data and deliver or exhibit such data to the user and/or otherwise make the data available to a user of the device. The authentication can be achieved by hearing the user's voice, receiving an entered password using a touch screen 104, receiving a finger print of the user using a finger print scanner 102, receiving a picture of the user using a camera 106 or the like. Once this basic authorization is received, the user can access the device and the device begins or continues to receive behaviometric data (see definition in the "summary"). The behavioral characteristics of a user include statistical measures of at least one or a plurality of key press times, key flight times, mouse movement, touchscreen data such as swipes, scrolls, taps, etc. and readings from sensors such as accelerometers, gyroscopes, radar, lidar and cameras. Behaviometric data changes over time in some instances whereas biometric data is more likely to remain constant or substantially constant. The behaviometric data is received using any of, or a combination of, the touch screen 104, and an accelerometer and/or gyroscope 109 which measures direction, angle and/or velocity of the device.

The behaviometric data recorded can also vary based on what is displayed on the screen 104 and how a user or alleged user interacts with the screen. For example, when a keyboard is displayed, inputs (such as presses or swipes) can be seen differently when directed at the keyboard (signifying entry of text) compared to when a swipe is used for example, to move/scroll a window. Each device which receives input is a form of a sensor, for purposes of this disclosure. The screen (display) 104 can have buttons which are pressed and input fields where text is entered to interact therewith. These may be displayed based on data which is sent via the packet switched network to be rendered (position and how displayed determined) at the end user device 100. When a bot 120 is standing in the place of the end user device 100, the fields and buttons may refrain from being rendered but a bot may respond to such inquiries for inputs based on how the bot emulates and culls from a rendered version thereof. The behaviometric data is thus recorded also for the bot's interactions with the input fields.

One or more bots 120 (see definition in the "summary") is connected to the packet switched network 97 (which can be the same as the network 99) at a network node 96 or network cloud and/or is executed on the end user device 100. In some embodiments, the bot emulated an end user device 100 and there is no separate end user device from the bot 120. Data which is intended for an end user device 100 associated with a particular end user, in some such embodiments of the disclosed technology, is instead routed to a bot 120 which is unknown to the server 110 and operators thereof until detected or determined using embodiments of the disclosed technology.

Figure 2:
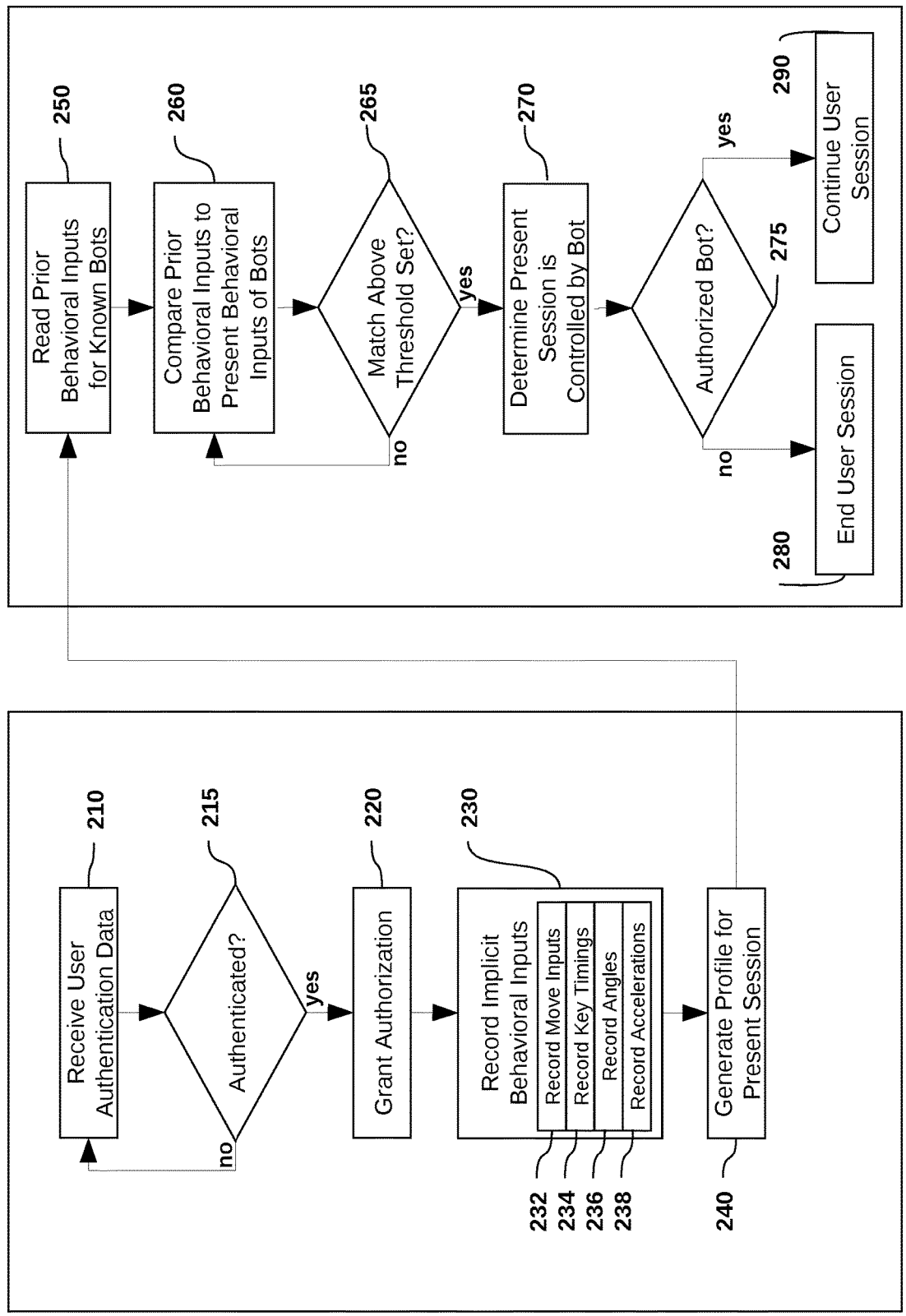
FIG. 2 shows a high level chart of steps carried out in an embodiment of the disclosed technology.

FIG. 2 shows a high level chart of steps carried out in an embodiment of the disclosed technology. A device, such as device 100 shown in FIG. 1, requires authentication to be accessed. In step 210, the user attempts to authenticate him or herself by sending authentication credentials to the device. This can be a biometric input, a password, a series of numbers, a particular swipe pattern or the like. If the user is successful, in step 215, the user is considered to be authenticated and is granted basic authorization to the device in step 220. For this step and purpose, the authentication is simply defined as "received enough security input into the device to allow access to some data which was previously unavailable." Here, "security input" is any necessary input which is used to prevent unmitigated access to the "some data." If the user is unable to provide same, then the user will have to try again and step 210 is carried out again. In some embodiments, a bot such as bot 120 has access to and provides the information to authenticate, creating a security risk when the bot is unauthorized.

Once the user is granted authorization in step 220, the user can go about using the device to send/receive information via a touch screen, camera, display, keyboard, mouse, and other inputs or outputs. In some embodiments, all aspects of the device are accessible or are apparently accessible to the user for those software programs, network connections, and inputs/outputs a user expects to have. During this time, however, when the user and/or his/her device and/or another device standing in the place of the end user device may be sending email, viewing websites, playing games, or accessing and otherwise utilizing the device especially for receiving, sending, and making financial transactions, behavioral inputs are being recorded in step 230. This can use the devices described with reference to FIG. 1 in addition to a computer mouse, microphone, and/or other inputs. Movement inputs can be recorded in step 232 (e.g. movement of a mouse or the device as a whole), key press timings can be recorded in step 234 (key down, key up, time between certain combinations of keys), angles can be recorded in step 236 (e.g. the angle the device is held while carrying out various tasks/using different software applications), and accelerations can be recorded in step 238 (e.g. how fast and in what direction the device moves/rotates in general and in conjunction with specific software applications and the like).

The behaviorial inputs can be recorded with or without the user being aware of same, depending on the embodiment of the disclosed technology. In some embodiments, the user may be aware of some of the behaviorial recordings, but not know how or what each behaviorial input is recorded. For example, one may know that their behavior is being used to determine that they are the rightful and authenticated user of a device, but they may not know that movement of the device is juxtaposed with a swipe to scroll, where the swipe to scroll is compared in multiple different software applications (defined as "coded instructions which are loaded into distinct and separate areas of memory") which have been determined to have common swipe characteristics. Thus, this sort of behaviorial recording and behaviorial authentication is therefore part of what is called "unknown" to the user.

In an optional step 240, a profile for the present user authenticated session can be generated with the behaviometric data stored. This "profile" is, in embodiments of the disclosed technology, stored behaviometric data associated with, or to be associated with a particular human user or bot. The profile can be malleable (changeable) over time with added or amended data as the inputs received from an end (human) user or bot modify over time for particular situations. The "profile" can also be the sum of behaviometric data stored at present for a current user session, a known human user, and/or a known bot or combination thereof (e.g. when a human user accesses data with some inputs or responses provided by a bot). Step 240 can take place simultaneously with, before, or after any of the other steps numbered between 210 and 290.

In step 260, the behavioral inputs, such as those in the profile in step 240 and/or those recorded in step 230, are compared to, in step 250, prior behavioral inputs for known bots. These bots each have their own prior recorded behaviorial inputs or otherwise known inputs, such as by observing a known bot interact. Each bot, based on its known inputs/reactions to data sent there-to (move inputs, key timings, angles, accelerations, and the like) and in some embodiments, updates and changes to behaviometric data for a bot through detecting the bot in one or more additional iterations of carrying out embodiments of the disclosed technology or otherwise acquiring such behaviometric data, is determined as part of step 250. In step 250 the known bot behaviometric data is read into memory and then when compared in step 260, it is determined if there is a match between a present user of an authenticated session (defined as the sending/and receiving of data from a server which is at least partially contingent upon particular authentication being received and maintained) and a bot. Sometimes the match is exact and other times the match between the present user and a particular bot is partial.

If the match is above a pre-determined threshold in step 265, then a determination is made that the present (authenticated) user is a particular bot. If not, then step 260 is carried out until a match to a bot is found and the user continues to have access to personal, financial, or otherwise private data. Once it is determined in step 270 that the present session/authenticated session is being controlled in part or in full by a particular bot, then in step 275, or before or concurrently in step 275, it is determined that the bot is an authorized bot. An authorized bot is one which is allowed access to a particular user or set of user's personal and/or financial data. A non-authorized bot is on which is not allowed access to a particular user or set of user's personal and/or financial data.

Upon determining that a present authenticated user is a human or a particular bot (authorized or non-authorized), the behaviometric data gleaned in steps 230 through 238, in some embodiments, is stored with the user profile and/or bot profile and used to carry out further embodiments of the disclosed technology such as in future user interactions with the device to verify that the user (or e.g. bot) is the same as a prior user (or e.g. bot) based on behaviometric data received in steps 240, 250, and 260.

Figure 3:
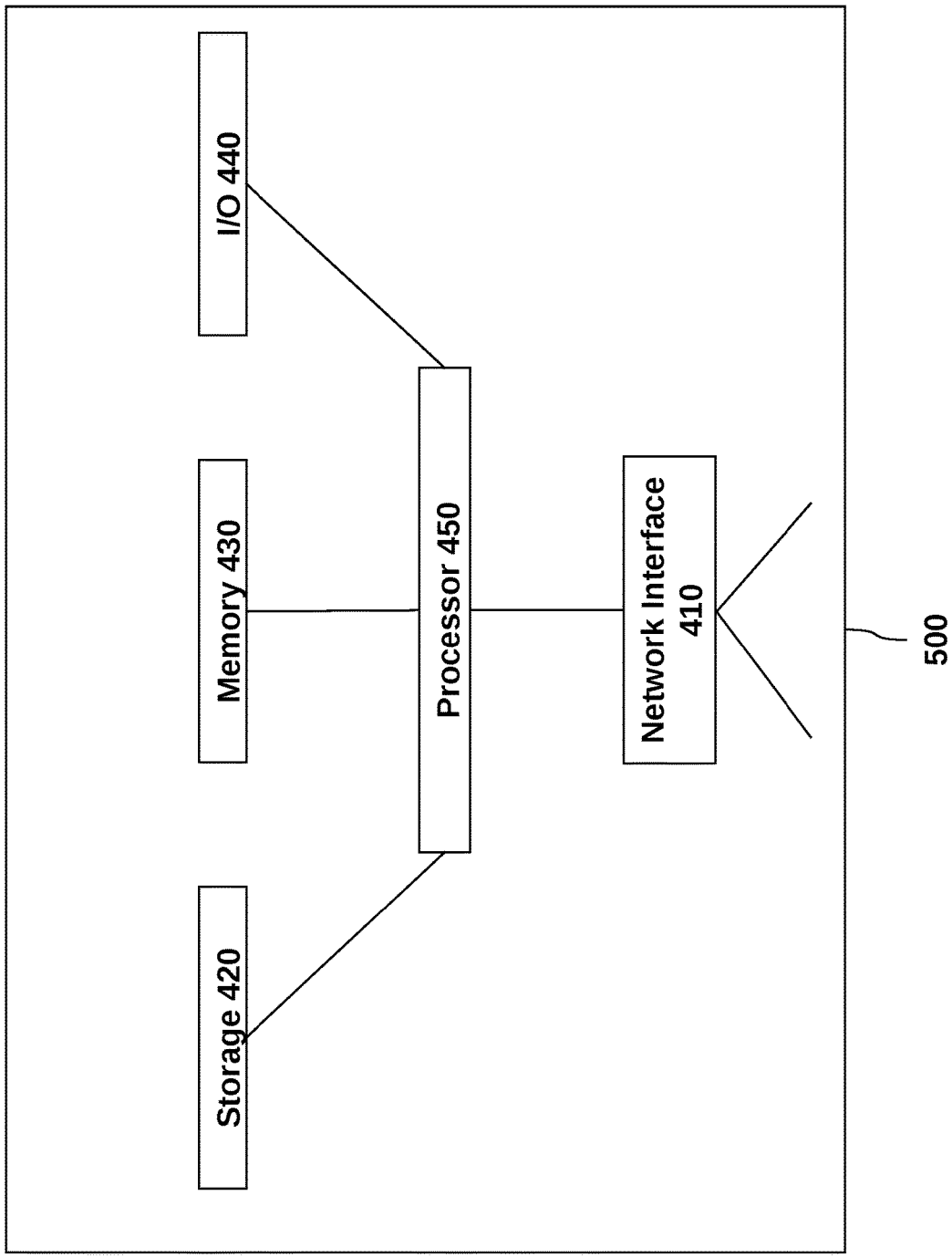
FIG. 3 shows a high level block diagram of devices used to carry out embodiments of the disclosed technology.

FIG. 3 shows a high level block diagram of devices used to carry out embodiments of the disclosed technology. Device 500 comprises a processor 450 that controls the overall operation of the computer by executing the device's program instructions which define such operation. The device's program instructions may be stored in a storage device 420 (e.g., magnetic disk, database) and loaded into memory 430 when execution of the console's program instructions is desired. Thus, the device's operation will be defined by the device's program instructions stored in memory 430 and/or storage 420, and the console will be controlled by processor 450 executing the console's program instructions. A device 500 also includes one or a plurality of input network interfaces for communicating with other devices via a network (e.g., the internet). The device 500 further includes an electrical input interface. A device 500 also includes one or more output network interfaces 410 for communicating with other devices. Device 500 also includes input/output 440 representing devices which allow for user interaction with a computer (e.g., display, keyboard, mouse, speakers, buttons, etc.). One skilled in the art will recognize that an implementation of an actual device will contain other components as well, and that FIG. 3 is a high-level representation of some of the components of such a device for illustrative purposes. It should also be understood by one skilled in the art that the method and devices depicted in FIGS. 1 through 2 may be implemented on a device such as is shown in FIG. 3.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

We claim:

1. A method of detecting a non-authorized bot, comprising steps of:
   sending data from a server disposed at a first network node at a first location on a packet switched network to an end user computer device disposed at a second network node at a second location on said packet switched network, aid end user computer device being associated with an end user, said data including an authentication request requiring said end user to provide authentication credentials to access secure data;
   at said server, receiving said authentication credentials from said end user computer;
   in response to determining that said received authentication credentials match credentials of said end user, sending at least some personal data from said server to said end user computer device;
   receiving additional data generated at said end user computer device and comparing characteristics, including timing, of said received additional data to bot signatures based on characteristics of data previously received from bots;
   based on said comparing, determining which bot generated said received additional data;
   continuing to grant access to and sending of said personal data to said end user computer device until a determination is made that said bot which generated said received additional data is a non-authorized bot.

2. The method of claim 1, wherein said comparing comprises comparing of key press timings used when providing said additional data to characteristic key-press timings in said bot signatures.

3. The method of claim 1, wherein said comparing comprises comparing a location on a screen or interface at which at least part of said additional data was bot signatures.

4. The method of claim 1, wherein said comparing comprises comparing an order in which data is received from said end user computer device to an order in said bot signatures, said data corresponding to particular requests for sending of data.

5. The method of claim 4, wherein said order is specific to a type of financial transaction to be carried out.

6. The method of claim 1, where said bot is further identified as authorized or non-authorized based on timing between each response received.

7. The method of claim 6, wherein said timing is a timing of a response to a particular request for data matched to a known timing in a said bot signature.

8. The method of claim 7, wherein said non-authorized bot is a script designed to receive said particular requests for sending data and to provide responses thereto based on a prior set of instructions received prior to said server receiving said authentication credentials.

9. The method of claim 1, further comprising, prior to said comparing, recording said bot signatures for said bots.

10. A method of denying access to data, comprising steps of:
- sending data via a server disposed at a first network node sufficient to generate authentication input requests on an end user computer device residing at a second network node, said end user computer device being associated with an end user;
- receiving from said end user computer device, at said server, at least two responses to said authentication input requests, each of said at least two responses including at least one authentication credential of said end user;
- determining, at said server, that said received authentication credentials match credentials of said end user;
- subsequently to said determining, comparing timing of said responses relative to one another to response timing characteristics included in at least one predetermined bot signature of at least one bot, thereby to identify a bot generating said responses;
- sending additional secure data from said server to said end user computer device, based on whether said identified bot is determined by said comparing to be an authorized bot or a non-authorized bot.

11. The method of claim 10, wherein said timing of said responses includes an order in which said at least two responses are received.

12. The method of claim 11, wherein said timing of said responses includes an amount of measured time between said end user computer device sending a first response and said end user computer device sending a second response.

13. The method of claim 12, wherein said additional secure data sent to said end user computer device believed to be operated by said authorized bot includes personal financial data.

14. The method of claim 13, wherein said server continues to send to said end user computer device said personal financial data until said server determines that said identified bot is a non-authorized bot, whereupon a request for said personal financial data from said end user computer device is denied.

15. The method of claim 10, wherein at least one of said authentication input requests comprises an input field, and wherein said comparing further comprises comparing a position within said input field at which a cursor is placed to provide said authentication input, at said end user computer device, to a pre-determined characteristic position included in said at least one bot signature and used by at least one said bot to be identified.

16. The method of claim 15, wherein said comparing comprises comparing said position within said input field for a plurality of said responses to said input requests, and averaging or weighting said timing of said responses relative to one another.

17. The method of claim 15, wherein said position within said input field is a specific coordinate at which one of said at least one input field, which is in a form of a button designed to be clicked, is clicked.

18. The method of claim 10, wherein said identified bot is a script designed to receive said input requests and to provide responses thereto based on a prior set of instructions received by said identified bot before said step of receiving said responses at said server.

19. The method of claim 10, wherein said authentication input requests are in the form of input fields and said timing of said responses is timing of entering data into and/or clicking on said input fields.

20. The method of claim 10, further comprising recording said bot signature for at least one bot, said bot signature including at least said response timing characteristics of said at least one bot.

* * * * *